US009494983B2

(12) United States Patent
Chang

(10) Patent No.: US 9,494,983 B2
(45) Date of Patent: Nov. 15, 2016

(54) FIXING APPARATUS OF EXPANSION CARD

(71) Applicant: HON HAI PRECISION INDUSTRY CO., LTD., New Taipei (TW)

(72) Inventor: Chun-Yuan Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 165 days.

(21) Appl. No.: 14/192,941

(22) Filed: Feb. 28, 2014

(65) Prior Publication Data

US 2015/0205333 A1 Jul. 23, 2015

(30) Foreign Application Priority Data

Jan. 17, 2014 (TW) .............................. 103101721 A

(51) Int. Cl.
*G06F 1/18* (2006.01)

(52) U.S. Cl.
CPC ................ *G06F 1/186* (2013.01); *G06F 1/183* (2013.01)

(58) Field of Classification Search
CPC ........... G06F 1/186; G06F 1/183; G06F 1/18
See application file for complete search history.

(56) References Cited

U.S. PATENT DOCUMENTS

| 5,406,453 | A | * | 4/1995 | Cusato | G06F 1/184 361/679.32 |
| 6,239,978 | B1 | * | 5/2001 | Liao | G06F 1/184 361/728 |
| 6,301,099 | B1 | * | 10/2001 | Felcman | G06F 1/184 312/332.1 |
| 6,404,624 | B1 | * | 6/2002 | Jeong | G06F 1/184 312/223.2 |
| 6,525,930 | B1 | * | 2/2003 | Rumney | G06F 1/181 361/679.32 |
| 6,969,131 | B2 | * | 11/2005 | Chen | G06F 1/184 312/223.2 |
| 7,075,797 | B1 | * | 7/2006 | Leonard | G06F 1/184 361/785 |
| 2005/0152122 | A1 | * | 7/2005 | Fan | G06F 1/184 361/752 |
| 2006/0044767 | A1 | * | 3/2006 | Wu | G06F 1/187 361/725 |
| 2008/0253076 | A1 | * | 10/2008 | Chen | G06F 1/186 361/679.31 |
| 2008/0263251 | A1 | * | 10/2008 | Chen | G06F 13/409 710/301 |
| 2008/0298030 | A1 | * | 12/2008 | Fan | G06F 1/185 361/759 |
| 2009/0034189 | A1 | * | 2/2009 | Springer | G06F 1/20 361/690 |
| 2012/0281373 | A1 | * | 11/2012 | Bohannon | H05K 7/1489 361/756 |
| 2013/0027875 | A1 | * | 1/2013 | Zhu | G06F 1/185 361/679.58 |
| 2013/0027891 | A1 | * | 1/2013 | Fan | G06F 1/186 361/748 |
| 2013/0033815 | A1 | * | 2/2013 | Yang | G06F 1/186 361/679.46 |
| 2013/0050926 | A1 | * | 2/2013 | Zhou | G06F 1/186 361/679.32 |

FOREIGN PATENT DOCUMENTS

| CN | 2634522 | Y | 8/2004 |
| CN | 2916739 | Y | 6/2007 |
| CN | 102004532 | A | 4/2011 |
| TW | M346952 | | 12/2008 |

* cited by examiner

*Primary Examiner* — Zachary M Pape
*Assistant Examiner* — Douglas Burtner
(74) *Attorney, Agent, or Firm* — Zhigang Ma

(57) ABSTRACT

A fixing apparatus of expansion board includes a supporting printed circuit board (PCB), a securing shelf, and a motherboard expansion slot. The supporting PCB is fixed on the securing shelf and is inserted into the motherboard expansion slot. The supporting PCB defines at least one slot to connect at least one expansion card.

5 Claims, 6 Drawing Sheets

FIXING APPARATUS OF EXPANSION CARD

BACKGROUND

1. Technical Field

The present disclosure relates to fixing apparatuses, and more particularly to a fixing apparatus of an expansion card.

2. Description of Related Art

With the development of the technology, the enclosure of the computer becomes smaller and smaller. Thereby, an inner room of the enclosure is limited and cannot receive other expansion cards.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
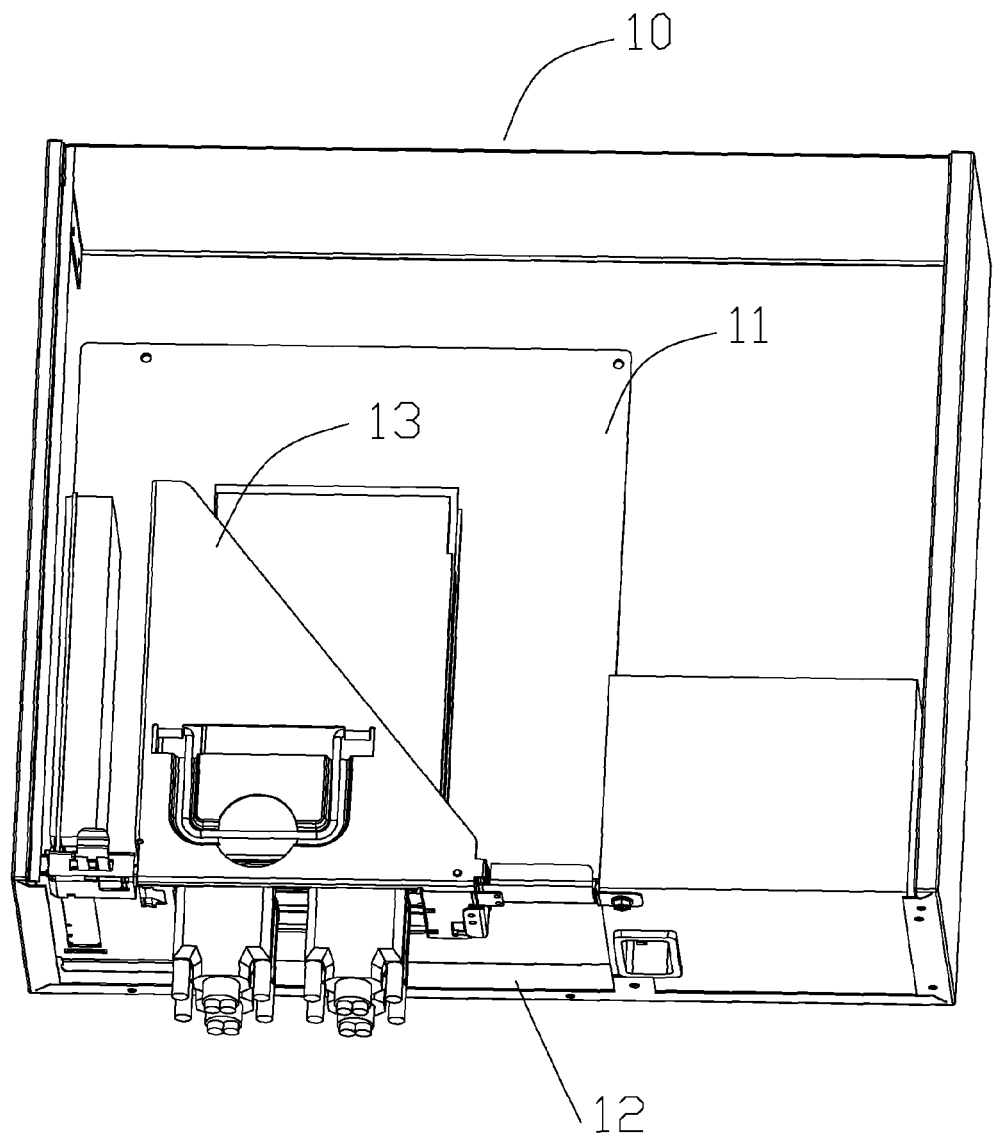
FIG. 1 is a schematic view of a securing shelf positioned in an enclosure of a fixing apparatus of an expansion board in accordance with an embodiment of the presently described disclosure.

FIG. 1 is a schematic view of the securing shelf positioned in an enclosure 10. The enclosure 10 includes a motherboard 11, a back lid 12 and a securing shelf 13. The motherboard 11 is positioned on the bottom of the enclosure 10 and near the back lid 12. The securing shelf 13 is installed in the back lid 12, and above of the motherboard 11.

Figure 2:
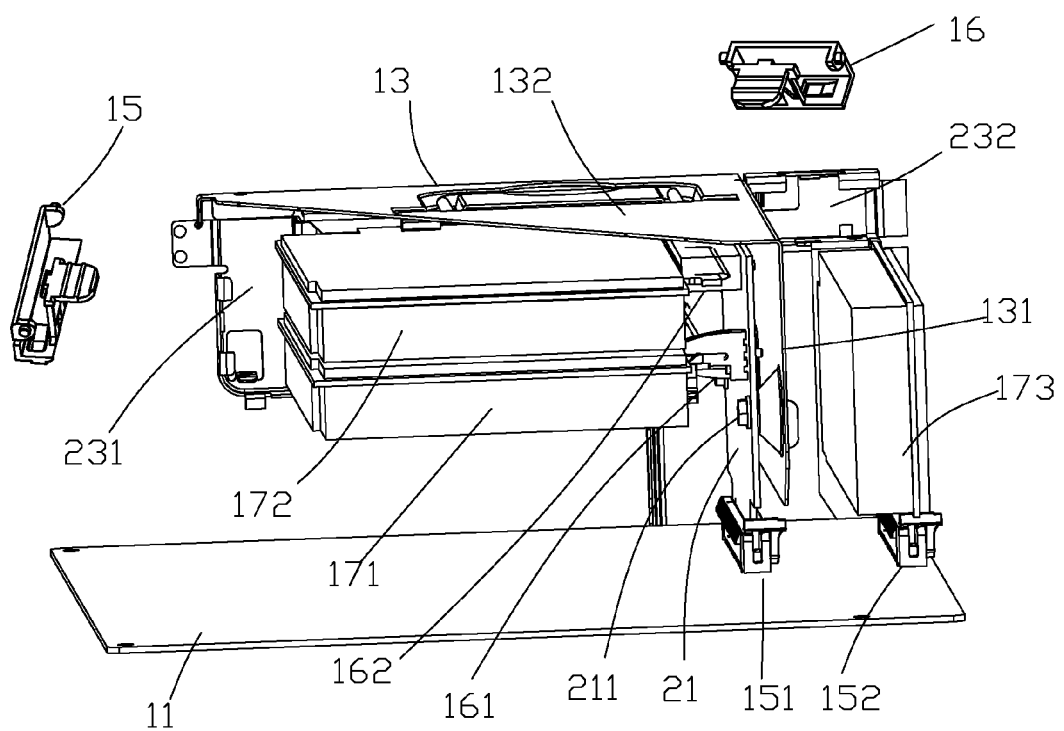
FIG. 2 is an assembled and exploded view of the securing shelf of FIG. 1.
Figure 5:
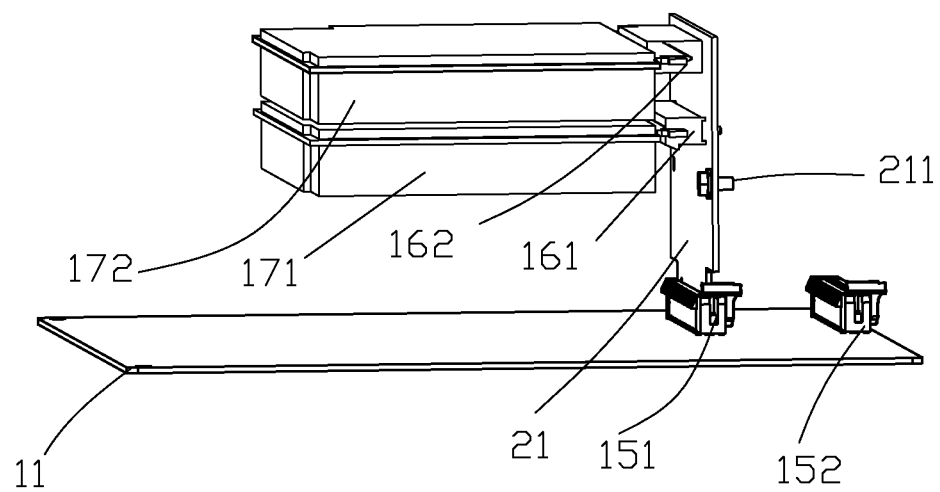
FIG. 5 is an assembled view of a supporting board of the fixing apparatus of an expansion board of FIG. 1.

FIGS. 2 and 5 show that a first motherboard expansion slot 151 and a second motherboard expansion slot 152 are fixed on a corner of the motherboard 11. The first motherboard expansion slot 151 and the second motherboard expansion slot 152 are parallel. A supporting Printed Circuit Board (PCB) 21 is inserted in the first motherboard expansion slot 151, at the same time, the supporting PCB 21 is fixed on the securing shelf 13. The supporting PCB 21 defines a first slot 161 and a second slot 162 parallel to the first slot 161. A first expansion board 171 is inserted in the first slot 161 and a second expansion board 172 is inserted in the second slot 162. A third expansion board 173 is inserted in the second motherboard expansion slot 152.

Figure 3:
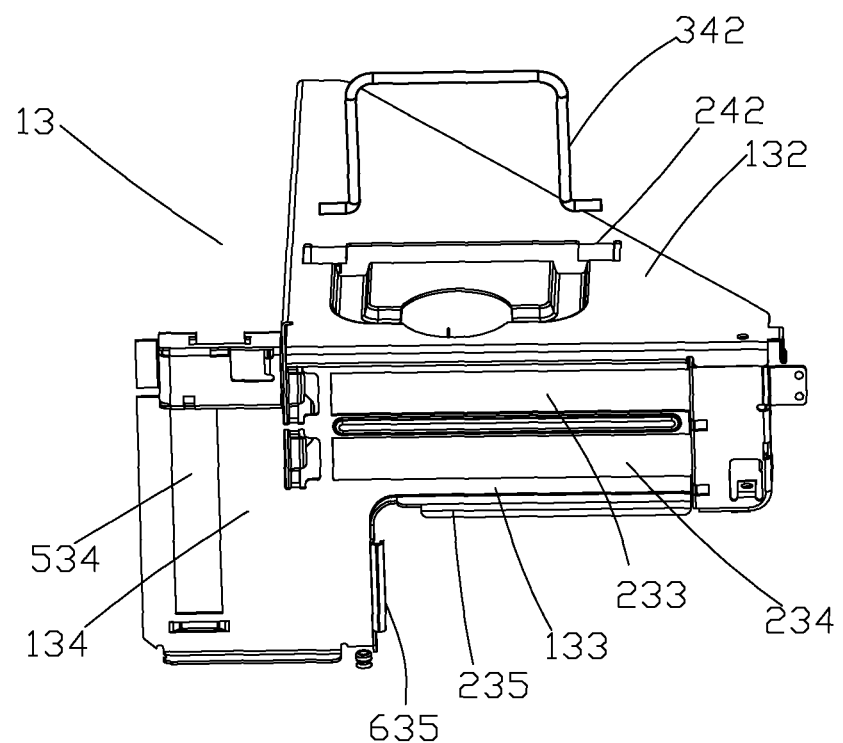
FIG. 3 is a side view of the securing shelf of FIG. 1.
Figure 4:
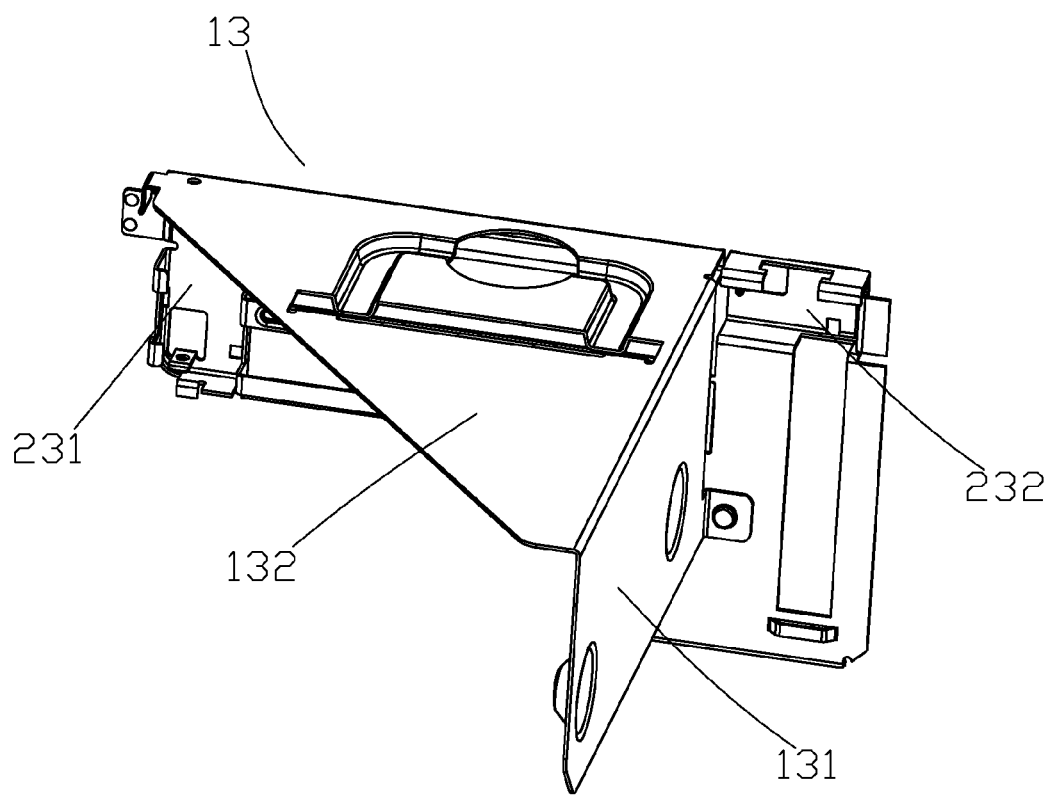
FIG. 4 is an isometric view of the securing shelf of FIG. 1.

FIGS. 2 to 4 show that the securing shelf 13 includes a plumb plane 131, a level plane 132, a front plane 133 and an extension plane 134. The plumb plane 131 is mainly a quadrate sheet metal. The front plane 133 and extension plane 134 are coplanar, and are mainly a quadrate sheet metal. The level plane 132 is mainly a triangular sheet metal, and connects to the plumb plane 131 and the front plane 133, respectively. The plumb plane 131 is vertical to the motherboard 11. The level plane 132 is parallel to the motherboard 11, and vertical to plumb plane 131. The front plane 133 is vertical to the level plane 132 and the plumb plane 131, respectively. The extension plane 134 coming from the front plane 133 extends in a direction.

Figure 6:
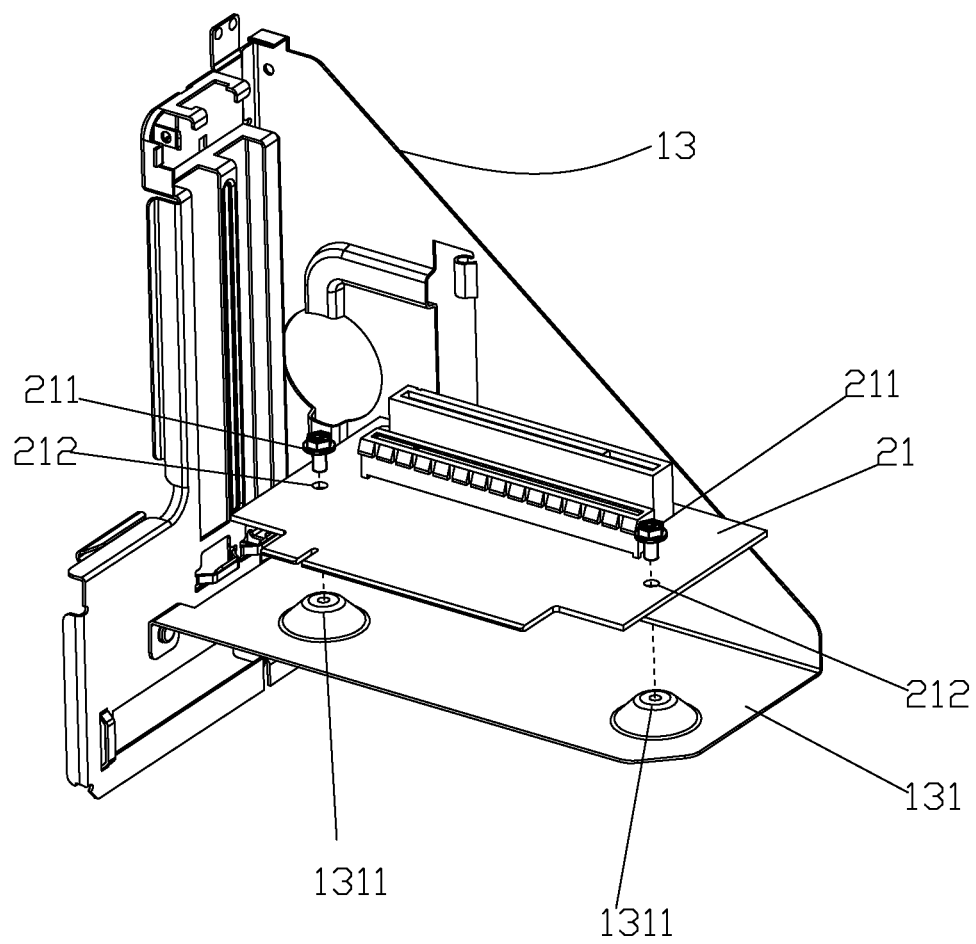
FIG. 6 is an assembled view of the supporting board and the securing shelf in accordance with an embodiment of the presently described disclosure.

FIGS. 2 and 6 show that the supporting PCB 21 defines two holes 212 under the first slot 161 and the second slot 162. The plumb plane 131 defines two screw thread holes 1311. The screw thread holes 1311 are relative to the holes 212 on the supporting PCB 21. Two screws 211 extend through the holes 212 and the screw thread holes 1311 to fix the supporting PCB 21 to the plumb plane 131. There is a bulge formed near the screw thread hole 1311 on the plumb plane 131 to keep a little space between the supporting PCB 21 and plumb plane 131 for dissipating heat.

FIGS. 3 and 4 are two isometric views of the securing shelf 13. A middle of the level plane 132 defines a lug groove 242. A lug 342 is placed in the lug groove 242 for raising the securing shelf 13. A middle of the front plane 133 defines a first window 233 and a second window 234 paralleled to the second window 234. The right side of the first window 233 and the second window 234 has a first receiving slot 231 on the front plane 133. The border under the front plane 133 defines a first connecting rib 235. Left of the extension plane 134 defines an upright third window 534. The above of the third window 534 has a second receiving slot 232 on the extension plane 134. The border of one end of the extension plane 134 defines a second connecting rib 635.

The first window 233, the second window 234 and the third window 534 are quadrate, and for containing a connecter. The first receiving slot 231 is used for containing a first latch 15 and the second receiving slot 232 is used for containing a second latch 16. The first latch 15 is used for fixing the first expansion board 171 and the second expansion board 172. The second latch 16 is used for fixing the third expansion board 173. The first connecting rib 235 and the second connecting rib 635 lock the back lid 12 to connect the securing shelf 13 to the back lid 12.

In present embodiment, the amount of the expansion board is more because of the first slot 161 and the second slot 162. The securing shelf 13 is used for securing the expansion board. At the same time, the securing shelf 13 defines three windows for containing connecter. In present disclosure, there is no need to change the volume of the enclosure or change the position of other components of the enclosure 10 for gaining the space for the expansion card.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A fixing apparatus of expansion board comprising:
   a securing shelf;
   a motherboard expansion slot;
   a supporting printed circuit board (PCB) fixed on the securing shelf and inserted into the motherboard expansion slot, the supporting PCB defining at least one slot to connect at least one expansion card; wherein the securing shelf comprises a plumb plane, a level plane, a front plane and an extension plane, the plumb plane, the level plane and the front plane are perpendicular to each other, and the front plane extends in a direction to form the extension plane, wherein the front plane and the extension plane are coplanar, wherein the front plane defines a first window and a second window, a first receiving slot is on the front plane, the extension plane defines a third window, a second receiving slot is on the extension plane, and the first receiving slot is used for receiving a first latch and the second receiving slot is used for containing a second latch.

2. The fixing apparatus of expansion board of claim 1, wherein the supporting PCB is fixed on the plumb plane 1 of the securing shelf by screws.

3. The fixing apparatus of expansion board of claim 1, wherein the level plane defines a lug to raise the securing shelf.

4. The fixing apparatus of expansion board of claim 1, wherein the first window, the second window and the third window are used for containing connecters.

5. The fixing apparatus of expansion board of claim 4, wherein the front plane defines a first connecting rib and the extension plane defines a second connecting rib, the first connecting rib and the second connecting rib are used for fixing the securing shelf to a back lid.

\* \* \* \* \*